United States Patent [19]

Tilling et al.

[11] 4,312,373
[45] Jan. 26, 1982

[54] INTERNAL VALVE

[75] Inventors: Basil B. Tilling, Mission Viejo; Henry A. Swindler, Tustin, both of Calif.

[73] Assignee: Parker-Hannifin Corporation, Cleveland, Ohio

[21] Appl. No.: 133,035

[22] Filed: Mar. 24, 1980

[51] Int. Cl.³ .............................................. F15C 1/14
[52] U.S. Cl. .............................. 137/393; 73/290 R; 137/842; 141/113; 141/128; 141/198; 251/28; 251/78; 251/243
[58] Field of Search ............. 73/290 R; 137/386, 390, 137/393, 413, 842, 403; 141/113, 128, 198; 251/28, 35, 77, 78, 242, 243

[56] References Cited

U.S. PATENT DOCUMENTS

| | | | |
|---|---|---|---|
| 2,045,758 | 6/1936 | Crossen, Jr. | 251/78 |
| 2,694,546 | 11/1954 | Goode | 251/243 |
| 2,762,389 | 9/1956 | Fraser | 137/390 |
| 2,775,258 | 12/1956 | Fraser | 137/413 |
| 3,047,009 | 7/1962 | Hunter | 137/403 |
| 3,095,894 | 7/1963 | Jensen | 137/413 |
| 3,174,503 | 3/1965 | Absolon | 137/393 |
| 3,561,465 | 2/1971 | de Graaf | 137/386 |
| 4,161,188 | 7/1979 | Jorgensen | 137/393 |

Primary Examiner—George L. Walton
Attorney, Agent, or Firm—Joseph B. Balazs

[57] ABSTRACT

An internal valve for the bottom loading of fuel tanks consists of a differential area piston acting within a chamber which is vented by a pair of pilot valves responsive to fluid level, to provide full open, throttled and closed positions of the valve automatically in response to inlet fluid pressure. Soft closure of the inlet valve which is formed of the piston head and a seat in the valve housing, is provided by metered fluid flow through an orifice between a sized aperture in the piston head and a restrictor sleeve carried on a tank vent actuator bar extending through the aperture and through the valve housing. A lost motion connection between the piston head and actuator bar allows limited relative movement for controlling the metering orifice and combined movement for coincident opening of the tank vent in response either to inlet fluid pressure or manual actuation.

8 Claims, 4 Drawing Figures

INTERNAL VALVE

BACKGROUND OF THE INVENTION

This invention relates generally to valves and more particularly to an internal valve for use in a system for filling and emptying fuel storage tanks and the like.

Fluid storage tanks may be provided with an internal valve which is mounted in an aperture in a lower portion of the housing providing ready access by an operator. A dependable structure, however is required, as the valve may control many thousands of pounds of fuel. Special devices are employed in this regard to assure that damage does not occur to the sealing element in such valve and one such measure is the provision of a soft closure or slow closure of such inlet valve to avoid extremely high closing force transients.

As the fueling operator does not have convenient access to the top of the tank being filled it is typical to have some means for remote actuation of the vent valve located there to avoid either pressure build up or partial vacuum in the tank. The actuation of the vent valve often is automatically combined with actuation of the main inlet valve by means of linkages or the like. Further, special devices have been employed to recognize that the tank has been filled to automatically close the main inlet valve, fluid jet sensors often being used in this regard in either a single or dual arrangement, the latter allowing an intermediate throttled condition of the inlet valve. Still further it is typical that such internal valve is capable of being automatically actuated in response to fluid pressure received at the inlet thereof with closure being provided as described, by the jet sensor derived devices or that the valve be manually actuable by the attendant in fueling or defueling modes.

Prior art embodiments of such forms of internal valve utilizing jet sensor control devices or soft closure for the main valve inlet are shown in U.S. Pat. Nos. 2,775,258, 3,095,894 and 3,174,503.

SUMMARY OF THE INVENTION

The present invention provides a valve which includes a housing having upper and lower portions, the upper portion forming a cylinder housing a differential area piston reciprocable therein toward and away from a valve seat formed in the lower housing portion, the piston head and seat comprising the main inlet valve. The piston includes an aperture in the central portion thereof to provide communication between the inlet to the valve and the cylinder chamber in the upper housing portion. An actuator bar for a remote tank vent extends through the center portion of the valve structure, passing through the aperture in the piston and serves to support a metering sleeve which restricts the aperture in the piston as the latter descends during closure of the main valve to provide a metered flow of fluid into the chamber and a slow closure of the inlet valve.

A pair of pilot valves are disposed in the upper housing portion and may be actuated from remote jet sensor devices or the like which sense fluid level within the tank being filled to provide a vented, partially vented or closed condition of the upper chamber. A pair of snap rings affixed to the actuator bar are spaced on either side of a portion of the piston head to provide a lost motion connection in order to allow a limited amount of relative movement between the actuator bar and the piston head as the piston approaches its seating position. Firm engagement between the actuator bar and the piston head at either end of the travel of lost motion assures that the vent valve is open when the main inlet valve is open, either automatically by virtue of applied inlet pressure or through manual actuation of the actuator bar. A further lost motion connection is provided between the actuator bar and a manual actuating lever such that spring bias returning the latter to a rest position does not affect the opening and closing of the main inlet valve.

DETAILED DESCRIPTION OF THE DRAWINGS

Figure 1:
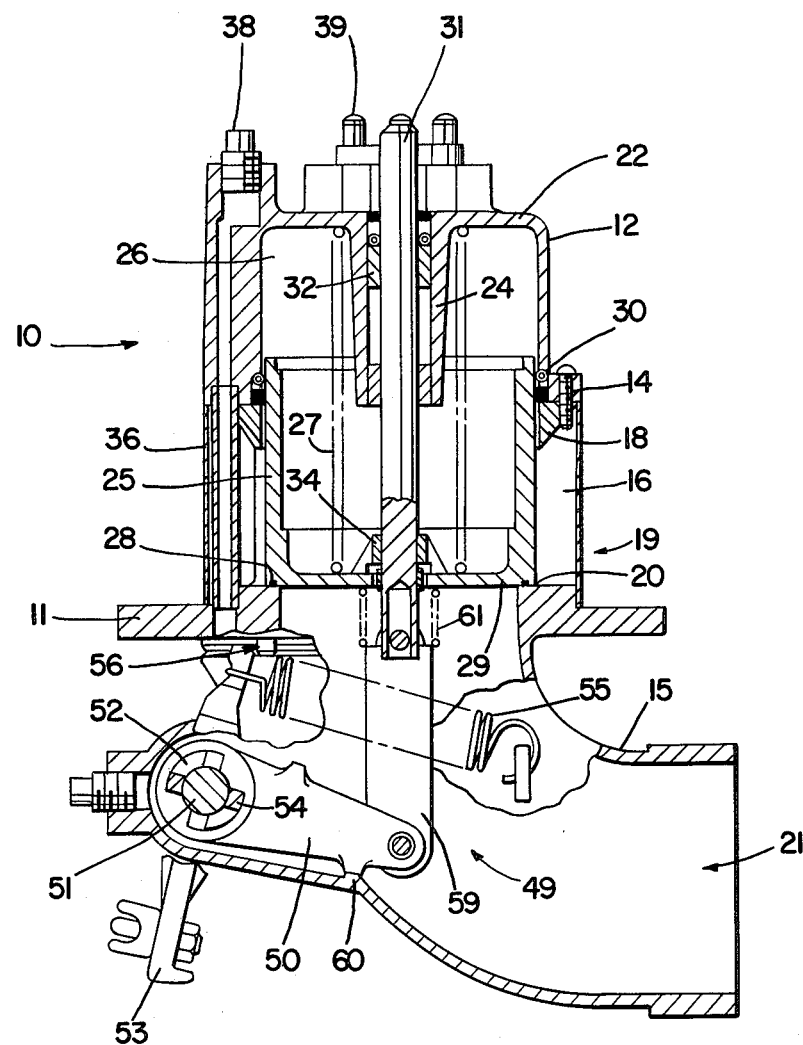
FIG. 1 is a side elevational view, partially in cross section of the preferred embodiment of internal valve of this invention.
Figure 2:
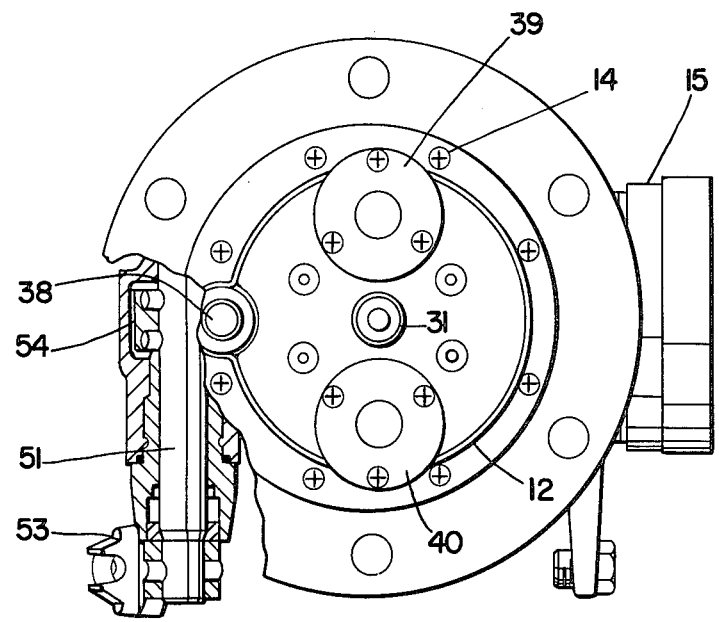
FIG. 2 is a plan view of the valve of FIG. 1.

Referring now to the drawings in greater detail item 10 refers to the preferred embodiment of internal valve, this being a two part housing assembly consisting of a lower housing 11 and an upper cap 12 secured thereto by screws 14. The lower housing 11 includes inlet elbow 15 which is adapted for connection to an inlet manifold, or other like valved structure for application of fluid under pressure to the valve or for de-fueling purposes. Spaced upstanding posts 16 support ring 18 thereon which provides a seat for upper cap 12 and which includes threaded apertures for receipt of mounting screws 14. The separation between the lower housing 11 and upper cap 12 provided by posts 16 as well as the spaces between posts 16 produces a relatively large and unobstructed outlet 19 for communication with the interior of the tank truck or the like which is to be filled or emptied of fuel. An annular valve seat 20 is machined in a central portion of the lower housing 11 and is disposed between the inlet 21 to elbow 15 and the outlet 19 of the valve structure. Upper cap 12 of the valve is generally of inverted cup shape having upper end wall 22 and is secured at its lower periphery. The cap 12 includes a hollow central boss 24, depending from upper wall 22.

Piston 25, also of cup shape, is slidably received within the inner periphery of cap 12 and forms therewith chamber 26 for receipt of fluid pressure for actuation of piston 25. Piston 25 carries annular seal 28 on the lower face of piston head 29 thereof and is slidably sealed at its peripheral cylindrical surface by means of annular seal 30 secured at the lower margin of cap 12. Spring 27 in chamber 26, biases piston 25 toward engagement with valve seat 20. A vent actuator rod 31 is slidably mounted in boss 24 in a pair of bushings 32 and in turn is slidably received in boss 34 located in a spider support in the central portion of the inner face of piston head 29. This arrangement provides guiding support for piston 25 between seal 30 and boss 34. Actuator rod 31 extends from above upper cap wall 22 to below piston head 29 and passes coaxially through circular aperture 35 in the central portion of piston head 29 below boss 34. Aperture 35 provides communication between inlet 21 and chamber 26 through piston head 29.

Figure 3:
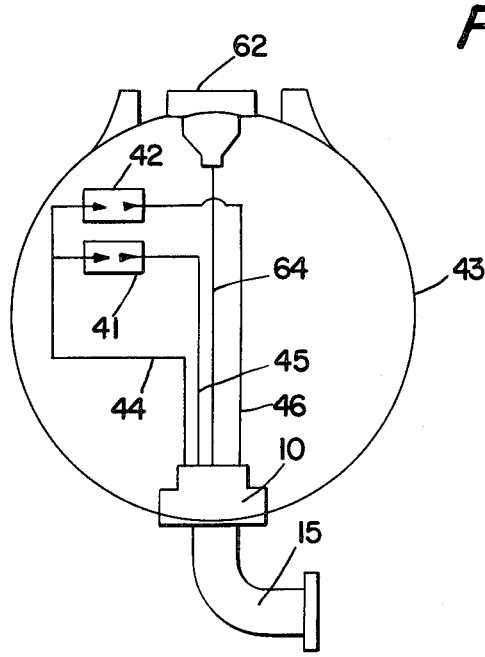
FIG. 3 is a schematic view of the internal valve of this invention as used in a system for filling and emptying a tank.

Internal valve 10 further includes aligned bores in cap 12 and lower housing 11 interconnected by tube 36 to provide fluid communication between inlet 21 and outlet port 38 in the upper portion of cap 12. A pair of pilot valves 39, 40 are disposed in upper wall 22 of cap 12, to provide variable communication between chamber 26 and the interior of the tank to be filled. The pilot valves 39, 40 are identical pressure actuated valves known as jet sensor valves and each is responsive to fluid pressure to open a valve poppet therein which is normally biased to a closed position. Fluid under pressure is received from inlet 21 by way of outlet port 38 and as seen in FIG. 3, is directed to a pair of jet sensors 41, 42 in tank 43, by means of conduit 44, the outlet of the sensors then being delivered by means of further conduits 45, 46 to pilot valves 39, 40 respectively. Thus, with fluid pressure at inlet 21, a pressure signal is received at conduits 45, 46 maintaining respective pilot valves 39, 40 in an open condition until fluid in the tank 43 covers the jet sensors 41, 42. At each sensor 41, 42 is covered in turn fluid pressure is prevented in conduits 45, 46 whereupon the associated pilot valves 39, 40 in turn will be returned to a closed position by means of internal springs.

Inlet elbow 15 further includes therein an actuating mechanism 49 for manually opening the internal valve consisting of a cam 50 rotatably supported on transverse shaft 51 by means of a lost connection consisting of arcuate slots 52 in the hub of the cam 50 which interengage with dogs 54 carried by the shaft 51. The shaft 51 is fixed to lever 53, biased in turn by means of spring 55 to a rest position against stop 56, and may be rotated therefrom in a counterclockwise direction by pull on lever 53 by means of an attached cable or the like.

At its inner end cam 50 is pivotally connected to interconnecting link 59, the latter in turn being pivotally connected to actuator rod 31. With cam 50 in a rest position as shown in FIG. 1, it is at its lowermost position in engagement with stop 60 formed in the housing of inlet elbow 15 and actuator rod 31 is likewise in its lowermost position. Return spring 61 is disposed between the lower face of the piston head 29 and the link 59 to avoid vibration and to return actuator rod 31 to its lowermost position. It will be clear that the actuator rod 31 may be raised a predetermined amount causing counterclockwise rotation of cam 50 about shaft 51 without movement of the actuating lever 53 or incurring the bias of spring 55, through the lost motion space provided by slots 52 until an engaged condition is attained. Conversely as the actuating lever 53 is manually rotated in a counterclockwise direction from its rest position against the bias of spring 55, immediate engagement of dogs 54 with the end walls of slots 52 occurs to rotate cam 50 therewith, raising actuator rod 31.

Actuator rod 31 is provided for opening and closing tank vent valve 62, typically disposed at the top of tank 43, vertically above the internal valve 10. Interconnection is made by solid rod 64 supported for abutting engagement with the top of actuator rod 31 although other means such as flexible push cables can be employed if the vent and valve are not in alignment. An internal spring in vent 62 returns the valve therein to a closed position and also urges connecting rod 64 against actuator rod 31.

Figure 4:
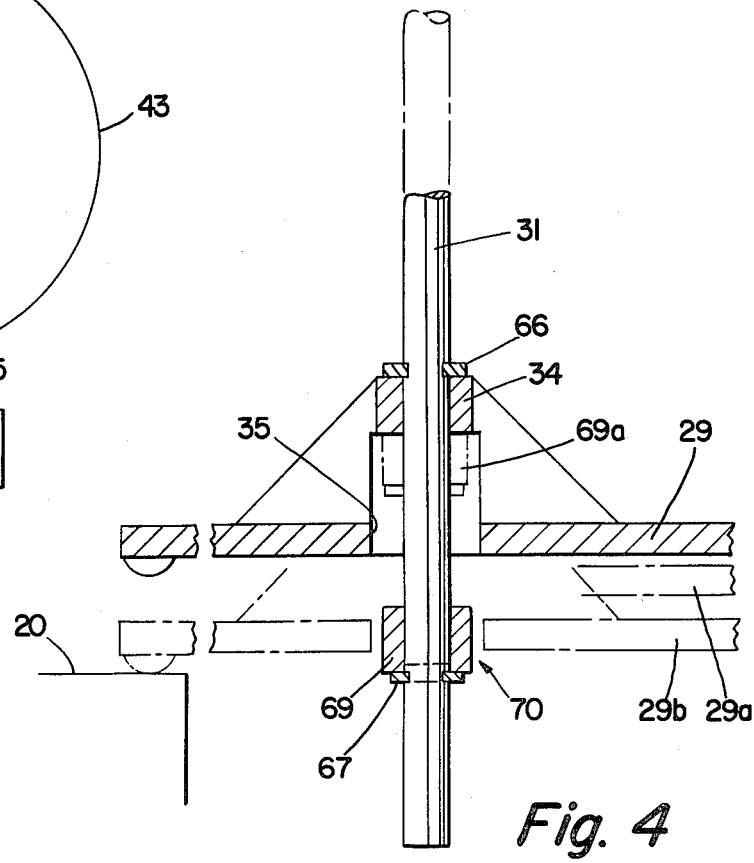
FIG. 4 is an enlarged view of the metering portion of the internal valve of FIG. 1 in different stages of operation.

Referring now more particularly to the enlarged partial sectional showing of the metering portion of the internal valve 10 shown in FIG. 4 it may be seen that the actuator rod 31 includes thereon a pair of split retaining clips 66, 67 which are spaced on either side of the boss 34 in the spider raised above the inner surface of the piston head 29. This allows a limited amount of relative movement between the actuator rod 31 and the piston head 29 and provides the lost motion connection therebetween. Annular metering sleeve 69 is secured to actuator rod 31 just above lower retaining clip 67 for movement therewith so that as piston head 29 descends in closing engagement toward valve seat 20, aperture 35 in piston head 29 will envelop metering sleeve 69 thereby forming metering orifice 70 therebetween for restriction of the flow of fluid from the inlet 21 into the chamber 26.

As shown in solid lines in FIG. 4 as piston head 29 is elevated, boss 34 comes into engagement with upper retaining clip 66, whereupon further upward movement of piston 29 will carry actuator rod 31 therewith to open the tank vent valve 62 simultaneous with the opening of the main inlet valve 20. Under manual actuation of the valve as shown partially in dashed lines in FIG. 4, upward movement of actuator rod 31 will result in movement of metering sleeve 69 through a lost motion to the position depicted at 69a in engagement with the lower surface of boss 34. This initial movement causes opening of vent valve 62. Further upward movement of actuator rod 31 causes simultaneous movement of piston head 29 and opening of the main inlet valve 20.

Referring again to FIG. 1 it may be seen that the following operation of the internal valve 10 obtains. With inlet elbow 15 coupled to a source of fluid for filling purposes and the actuating lever 53 and actuator rod 31 in the rest position depicted, fluid under pressure will act upon the lower face of piston head 29 across the area determined by piston seal 28 to lift piston 25 from seat 20 against the bias of spring 27 to allow fluid flow through the outlet 19 of the valve into the interior of tank 43. Fluid pressure at the inlet 21 is routed by means of tube 36 and the outlet port 38 to jet sensors 41, 42 for actuation of pilot valves 39, 40, thereby venting chamber 26 and allowing upward movement of the piston 25. Fluid communication is established through aperture 35 in piston head 29 such that chamber 26, if not already filled, will be filled with fluid from inlet 21. Boss 34 will engage with upper retaining clip 66 after movement thereby lifting actuating rod 31 with the piston 25 causing an opening of the tank vent valve 62 so as to allow the introduction of fuel into the tank and to relieve the build-up of interior tank pressure.

Inlet valve 20 will remain open until the fluid level within the tank 43 covers the lowermost jet sensor 41 causing a closure of the associated pilot valve 39 and a restriction to the venting of upper chamber 26. Increased fluid pressure will be developed within chamber 26 and, acting upon the area of cylinder seal 30, will create a closing force to move the piston 25 to a partially closed position such as that position depicted in solid lines in FIG. 4 where the piston seal 28 is spaced a distance from the valve seat 20 to provide a throttled flow of fluid through the outlet 19 of the valve 10.

This slower flow of fluid into tank 43 results in lowered turbulence and allows a more accurate filling of the tank which continues until upper jet sensor 42 is covered by fluid. With loss of fluid pressure at the second pilot valve 40, chamber 26 will no longer be vented and fluid from inlet 21 will develop additional force against piston 25 to urge the piston through an intermediate position depicted by the dashed line showing of piston head 29a, to the full closed position depicted by the dashed line showing of piston head 29b. In the full closed position seal 28 is fully engaged with and compressed against valve seat 20, completely isolating inlet 21 from outlet 19.

As piston 25 descends in closing movement, actuator rod 31 descends therewith under urging of gravity, return spring 61 and a spring internal of vent valve 62. Retaining clip 66 remains in engagement with the upper surface of boss 34 until a position is reached where further movement of actuator rod 31 is prevented, due to engagement of cam 50 with stop 60. At this intermediate position depicted at 29a in FIG. 4, vent valve 62 will be fully closed. Piston 25 will continue to descend and as the piston head as shown at 29a and 29b approaches valve seat 20, it will envelop metering sleeve 69 creating an annuar metering orifice 70 which will restrict the flow of fluid into chamber 26, thereby slowing the rate of movement of piston 25. Piston 25 will continue to descend, undergoing movement relative to actuator rod 31, until the position depicted at 29b is attained with seal 28 fully engaged and compressed against valve seat 20. Metering orifice 70 is sized by means of the relative dimensions of aperture 35 and metering sleeve 69 to provide a desired rate of slow or soft closure of the valve to avoid high shock forces which might affect the various components of the valve and which could overstress seal 28.

Manual actuation of the internal valve 10 is effected by movement of actuating lever 53, as described, causing counterclockwise rotation of cam 50 and direct lifting of actuator rod 31 through the intermediacy of connecting link 59. Such condition is approximately depicted in FIG. 4 wherein the actuator rod 31 has been lifted to a position where sleeve 69, carried therewith, engages the underside of boss 34. This initial upward movement causes opening of the tank vent valve 62 prior to opening the main valve 20. Continued upward movement of actuator rod 31, by virtue of the engagement between sleeve 69 and boss 34 as indicated as 69a, lifts piston 25 therewith to open the main valve 20 for entry of fluid into the tank 43, or for allowing the defueling of same. Release of lever 53 causes a return to rest position against stop 56 under urging of spring 55 and allows actuator rod 31 to return to its lowermost position, through the lost motion connection, together with piston 25, reestablishing the closed condition between seal 28 and seat 20.

While the dual valve arrangement of pilot valves 39, 40 is depicted in the preferred embodiment of the invention it will be apparent that a similar operation obtains with use of only a single pilot valve except that the relatively controlled throttled condition of the piston 25 is not realized. It will be clear also, that fluid pressure may be obtained by way of a dead-man switch or the like from the inlet 21 for application to one or more pilot valves as an alternative to that depicted in the preferred embodiment of the invention.

What is claimed is:

1. An internal valve for filling tank trucks and the like through an aperture in a bottom partition of the tank, comprising a valve housing having inlet and outlet ports therein, a valve seat in said housing disposed between said inlet and outlet ports for controlling fluid flow therethrough, a chamber in said housing, a piston slidable in said chamber in response to fluid pressure therein toward and away from said valve seat for closing and opening communication between said inlet and outlet ports, said piston having an aperture in the head thereof providing a path for fluid flow from said inlet port to said chamber to build-up fluid pressure in said chamber to urge said piston to its close position, pilot valve means in said housing for controlling fluid flow from said chamber, thereby controlling the position of said piston therein relative to said valve seat, a flow restrictor for restricting flow of fluid through said piston aperture when said piston is adjacent said valve seat to slow the rate of closure for gently seating said piston on said valve seat, an actuator member disposed in said piston aperture extending from said inlet port to a location external of said housing for cooperation with a tank vent valve for relieving pressure within the tank, means for limiting movement of said actuator member at a predetermined rest location, a lost motion connection between said piston and said actuator member providing limited relative movement therebetween, said flow restrictor being mounted on said actuator member for movement therewith and to be positioned at a predetermined location when said actuator member is in the rest location to cooperate with said piston to restrict fluid flow through said piston orifice, said actuator member comprising a rod journalled in said housing for reciprocatory movement in said piston aperture, said flow restrictor comprising a projection on said actuator member adapted to be closely received in said piston aperture as said piston descends toward seating engagement with said valve seat to form a restricted orifice for limiting fluid flow in said chamber, said lost motion connection between said piston and actuator member comprising first and second abutment members on said actuator rod positioned on opposite sides of an intermediate portion of said piston so as to engage said piston portion at the opposite ends of relative travel therebetween.

2. The valve as set forth in claim 1 wherein said flow restrictor is a sleeve on said actuator member adapted to be received in said piston aperture as said piston descends toward seating engagement with said valve seat.

3. The valve as set forth in claim 2 wherein the outside diameter of said sleeve is slightly less than the diameter of said piston aperture to provide a restricted flow path about the periphery of said sleeve.

4. The valve as set forth in claim 1 further including a lever for manually lifting said actuator member from a location external of said valve housing, a spring biasing said lever to a rest position and lost-motion connection means between said lever and said actuator member to provide limited relative movement therebetween.

5. The valve as set forth in claim 4 wherein the range of lost motion between said lever and said actuator member is greater than the range of lost motion between said piston and said actuator member so that the condition of restricted fluid flow through said piston aperture is not affected by said lever bias spring.

6. The valve as set forth in claim 5 wherein said pilot valve means comprises first and second fluid pressure responsive valves in said valve housing for providing partial and complete closure of said chamber thereby to provide throttled and complete closure of said valve seat.

7. The valve as set forth in claim 6 wherein said valve housing comprises a lower portion adapted to be seated in an aperture in a tank and a cap secured to said lower portion, said cap forming one end of said chamber in which said piston is received, said pilot valve means being disposed in said cap, an aperture in said lower housing in communication with said valve inlet port, and a tube providing fluid communication between said lower housing aperture and said cap, thereby to provide a fluid connection for controlling said pilot valve means from fluid pressure at said inlet port, by way of internal valve structure and as a function of the changes in the fluid level within the tank.

8. The valve as set forth in claim 7 wherein said flow restrictor is one of said first and second abutment members.

* * * * *